United States Patent
Puffer et al.

(10) Patent No.: US 7,178,045 B2
(45) Date of Patent: Feb. 13, 2007

(54) OPTIMIZING EXIT LATENCY FROM AN ACTIVE POWER MANAGEMENT STATE

(75) Inventors: David M. Puffer, Tempe, AZ (US); Suneel G. Mitbander, Phoenix, AZ (US); Sarath K. Kotamreddy, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 10/749,619

(22) Filed: Dec. 30, 2003

(65) Prior Publication Data

US 2005/0144487 A1    Jun. 30, 2005

(51) Int. Cl.
   G06F 1/26    (2006.01)
   G06F 1/32    (2006.01)
(52) U.S. Cl. ............ 713/300; 713/320; 713/323; 713/324; 379/323; 379/395.01; 455/127.1; 455/522; 455/572; 455/574
(58) Field of Classification Search ........... 713/300, 713/320, 323, 324; 379/323, 395.1; 455/127.1, 455/522, 572, 574
See application file for complete search history.

(56) References Cited

U.S. PATENT DOCUMENTS

| | | | | |
|---|---|---|---|---|
| 5,652,895 A | * | 7/1997 | Poisner | 713/322 |
| 5,721,935 A | * | 2/1998 | DeSchepper et al. | 713/323 |
| 5,890,004 A | | 3/1999 | Poisner | |
| 5,991,635 A | * | 11/1999 | Dent et al. | 455/517 |
| 6,021,506 A | | 2/2000 | Cho | |
| 6,131,167 A | | 10/2000 | Cruz | |
| 6,272,644 B1 | * | 8/2001 | Urade et al. | 713/320 |
| 6,282,665 B1 | | 8/2001 | Cruz | |
| 6,463,542 B1 | * | 10/2002 | Yu et al. | 713/320 |
| 2003/0185308 A1 | * | 10/2003 | Schoenborn | 375/257 |
| 2004/0103333 A1 | * | 5/2004 | Martwick et al. | 713/400 |
| 2005/0097378 A1 | * | 5/2005 | Hwang | 713/320 |
| 2005/0149768 A1 | * | 7/2005 | Kwa et al. | 713/300 |

FOREIGN PATENT DOCUMENTS

WO  PCT/US2004/043418    12/2004

OTHER PUBLICATIONS

International application No. PCT/US2004/043418, International Preliminary Report on Patentability.

* cited by examiner

Primary Examiner—Lynne H. Browne
Assistant Examiner—Nitin C. Patel
(74) Attorney, Agent, or Firm—Ted A. Crawford

(57) ABSTRACT

A transmitting device and a receiving device are coupled together via an interconnect. An electrical idle ordered set is received at the receiving device power management unit after having been transmitted by the transmitting device and received at the input pins of the receiving device and moving through the receiver logic pipeline. At the time the electrical idle ordered set has been recognized at the end of the receiver logic pipeline, the power management unit checks for activity on the interconnect. If there is no activity on the interconnect, then the power management unit causes the receiving device to enter a low power state where the receiver circuitry (input buffers) is turned off. If there is activity on the interconnect when the electrical idle ordered set is received at the power management unit, then the power management unit does not cause the receiver circuitry to be turned off.

16 Claims, 3 Drawing Sheets

OPTIMIZING EXIT LATENCY FROM AN ACTIVE POWER MANAGEMENT STATE

FIELD OF THE INVENTION

The present invention pertains to the field of computer systems. More particularly, this invention pertains to the field of power management within a computer system.

BACKGROUND OF THE INVENTION

Power management has become and will continue to be an important factor in computer system component design. One technique to reduce power consumption is to turn off input and/or output buffer circuits when an interconnect is idle for a period of time.

One interconnect implementation that is gaining industry acceptance is based on the PCI Express specification (PCI Express Base Specification, revision 1.0a). The PCI Express specification defines an active power management state called "L0s." In this state, a device turns off its transmitters to save power whenever the transmitter is idle for up to 7 us.

A transmitting device on one side of a PCI Express point-to-point link is required to communicate to the receiving device on the other side of the link that the transmitting device is entering the L0s state. This is accomplished by delivering a packet of information called an "electrical idle ordered set" to the receiving device. In response to receiving the electrical idle ordered set, the receiving device enters the L0s state and turns off its receiver circuit (including input buffers). When the transmitting device exits the L0s state and desires to recommence communication with the receiving device, the transmitting device begins by delivering a series of "fast training sets" (FTS). An FTS includes special characters that are recognized by the receiving device and allow the receiving device to achieve bit and symbol synchronization following the period of no activity on the interconnect. A typical FTS is 4 bytes in length. The FTS series is received at the receiving device input circuitry, and after bit and symbol synchronization are achieved the FTS moves through the receiver pipeline circuitry until it is received by a power management unit that responds to the FTS by causing the receiving device to exit the L0s state. A typical PCI Express device may have a pipeline delay of 20 or so symbol clock periods.

The number of FTS that must be transmitted by the transmitting device to the receiving device depends on the greatest length of time it may require for the receiving device to recognize activity on the interconnect, turn on the receiver circuit, achieve bit and symbol lock, and reset receiver pipeline logic. When the transmitting device and the receiving device first detect each other's presence, perhaps at system start-up, the receiving device must communicate to the transmitting device the minimum number of FTS that must be transmitted by the transmitting device to the receiving device when exiting the L0s state.

A problem may occur when the transmitting device enters L0s (sending an electrical idle ordered set to the receiving device) and quickly (in as little as 20 ns) exits L0s (thereby beginning transmission of the FTS series). In this case, the transmitting device would exit L0s and start transmitting FTS before the electrical idle ordered set has a chance to move through the receiving device pipeline and be recognized by the power management unit. In this situation, the power management unit will cause the receiving device to enter the L0s state (turning off the receiver circuitry) even though the transmitting device is already sending FTS. The receiving device will exit L0s soon thereafter in response to the continued activity on the interconnect, but a number of FTS will have gone by without being recognized by the receiving device. Thus, the transmitting device may begin to send higher-level packets before the receiving device is prepared to receive the packets, and the data will be lost.

To counter this difficulty, the minimum number of FTS that must be transmitted from the transmitting device to the receiving device when the transmitting device exits the L0s state is inflated to cover the pipeline delay time, thereby ensuring that the receiving device will receive adequate time to enter and exit the L0s state and be prepared to receive higher-level packet data even in the case where the transmitting device enters and exits L0s quickly.

Low power states such as L0s are most useful when they can be entered and exited as quickly as possible. Low entry and exit latencies allow the low power states to be applied more liberally without adversely affecting interconnect performance.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, a transmitting device and a receiving device are coupled together via an interconnect. An electrical idle ordered set is received at the receiving device power management unit after having been transmitted by the transmitting device and received at the input pins of the receiving device and moving through the receiver logic pipeline. At the time the electrical idle ordered set has been recognized at the end of the receiver logic pipeline, the power management unit checks for activity on the interconnect. If there is no activity on the interconnect, then the power management unit causes the receiving device to enter a low power state where the receiver circuitry (input buffers) is turned off. If there is activity on the interconnect when the electrical idle ordered set is received at the power management unit, then the power management unit does not cause the receiver circuitry to be turned off.

This allows the receiving device to recognize the situation where the transmitting device enters and exits the L0s state quickly, and the receiving device can avoid turning the receiving circuitry off and then on again. This minimizes the chances that an FTS and any subsequent data packets will be unrecognized. This in turn means that the minimum number of FTS that must be sent from the transmitting device to the receiving device when the transmitting device exits L0s can be reduced to essentially only the amount necessary for the receiving device to achieve bit and symbol synchronization.

Figure 1:
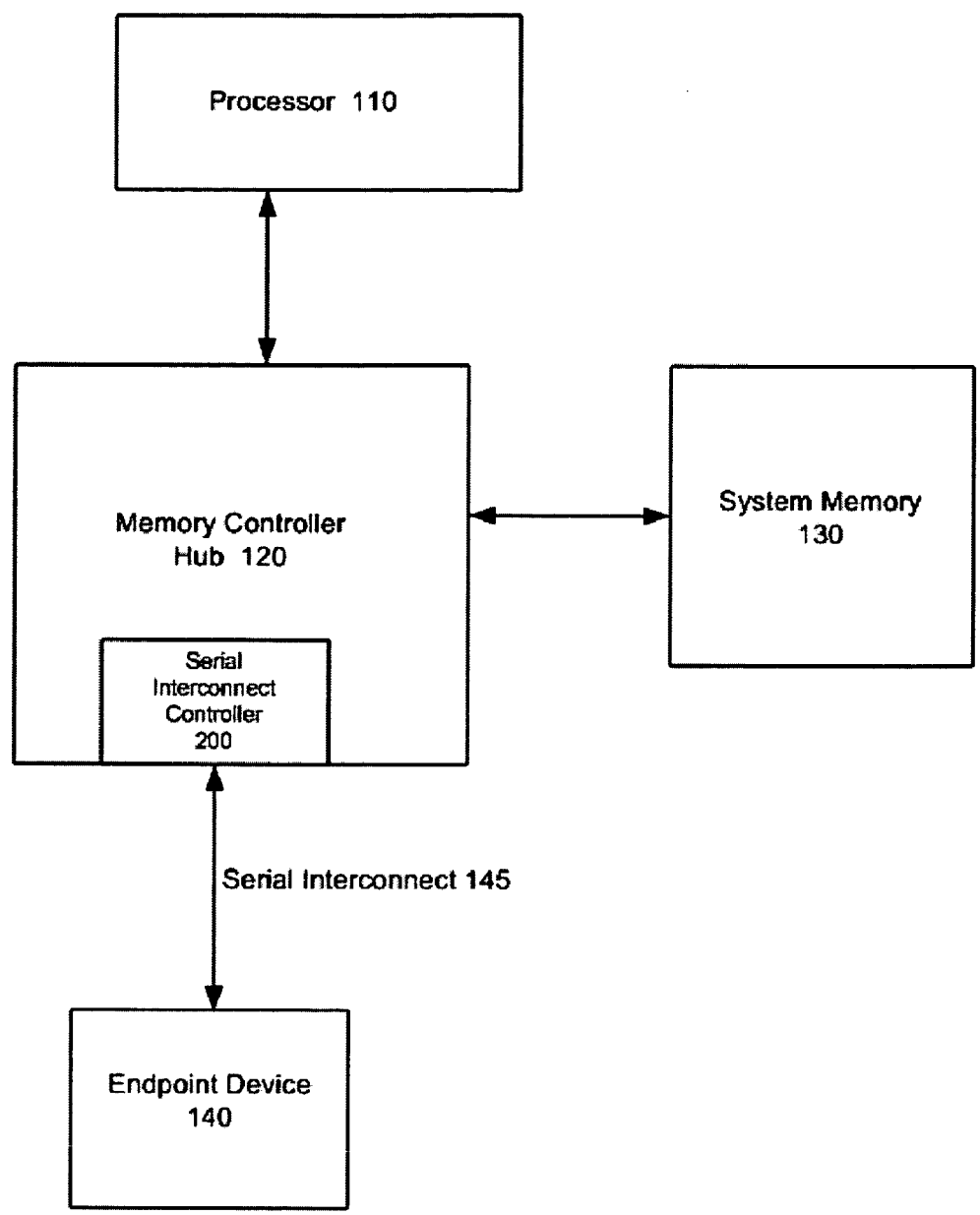
FIG. 1 is a block diagram of one embodiment of a computer system including a serial interconnect coupling a serial interconnect controller with an endpoint device.

FIG. 1 is a block diagram of one example embodiment of a computer system including a serial interconnect 145 coupling a serial interconnect controller 200 with an endpoint device 140. The endpoint device 140 may be any of a wide range of devices, including a graphics controller, a network controller, etc.

The system of FIG. 1 also includes a processor 110 coupled to a memory controller hub 120. The memory controller hub 120 is further coupled to a system memory 130. The memory controller hub 120 includes the serial interconnect controller 200.

For this example embodiment, the serial interconnect 145 is a PCI Express link, although other embodiments are possible using other interconnect types. The serial interconnect 145 is a bi-directional link, although, for purposes of example, in this discussion the serial interconnect controller 200 will be discussed as being a receiving device and the endpoint device 140 will be described as being a transmitting device.

Figure 2:
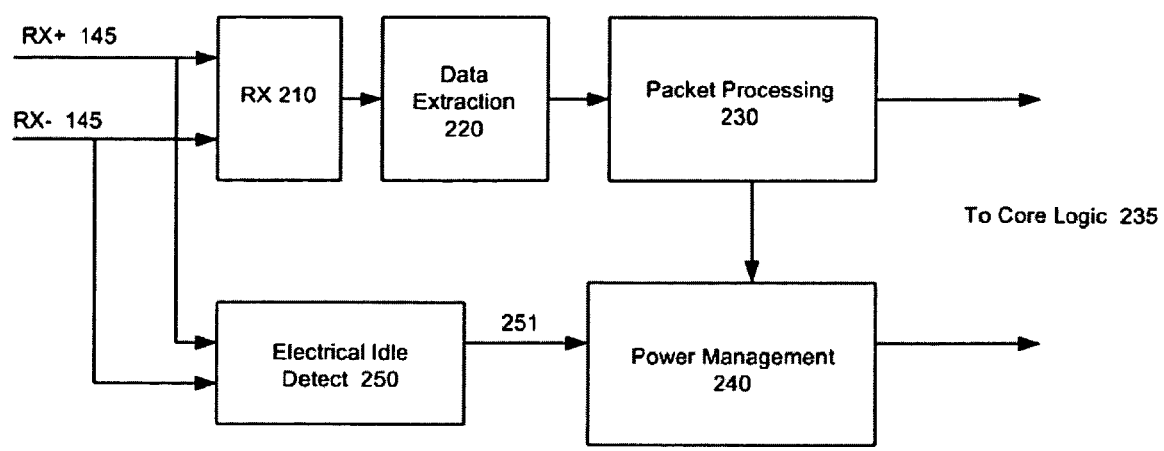
FIG. 2 is a block diagram of a receiving device couple to an interconnect.

FIG. 2 is a block diagram of a portion of the serial interconnect controller 200. Again, this discussion will treat the serial interconnect controller 200 as a receiving device, although in practice the interconnect 145 is a bi-directional link. The serial interconnect controller device 200 receives data over a differential pair of signals 145 (RX+ and RX−). The signals 145 are received at receiving circuitry 210. The receiving circuitry 210 includes input buffers (not shown). The controller 200 also includes receiver pipeline circuitry for processing the received signals, including a data extraction unit 220 and a packet processing unit 230. The units 220 and 230 perform various functions including bit and symbol recovery, clock compensation, and packet processing.

The serial interconnect controller 200 also includes an electrical idle detect circuit 250. This circuit asserts a signal 251 when there is no activity on the signals 145.

The serial interconnect controller 200 further includes a power management unit 240 that receives input from the packet processing unit 230 and also receives signal 251 from the electrical idle detect circuit 250. The power management unit 240 includes a state machine that is described below in connection with FIG. 3.

Figure 3:
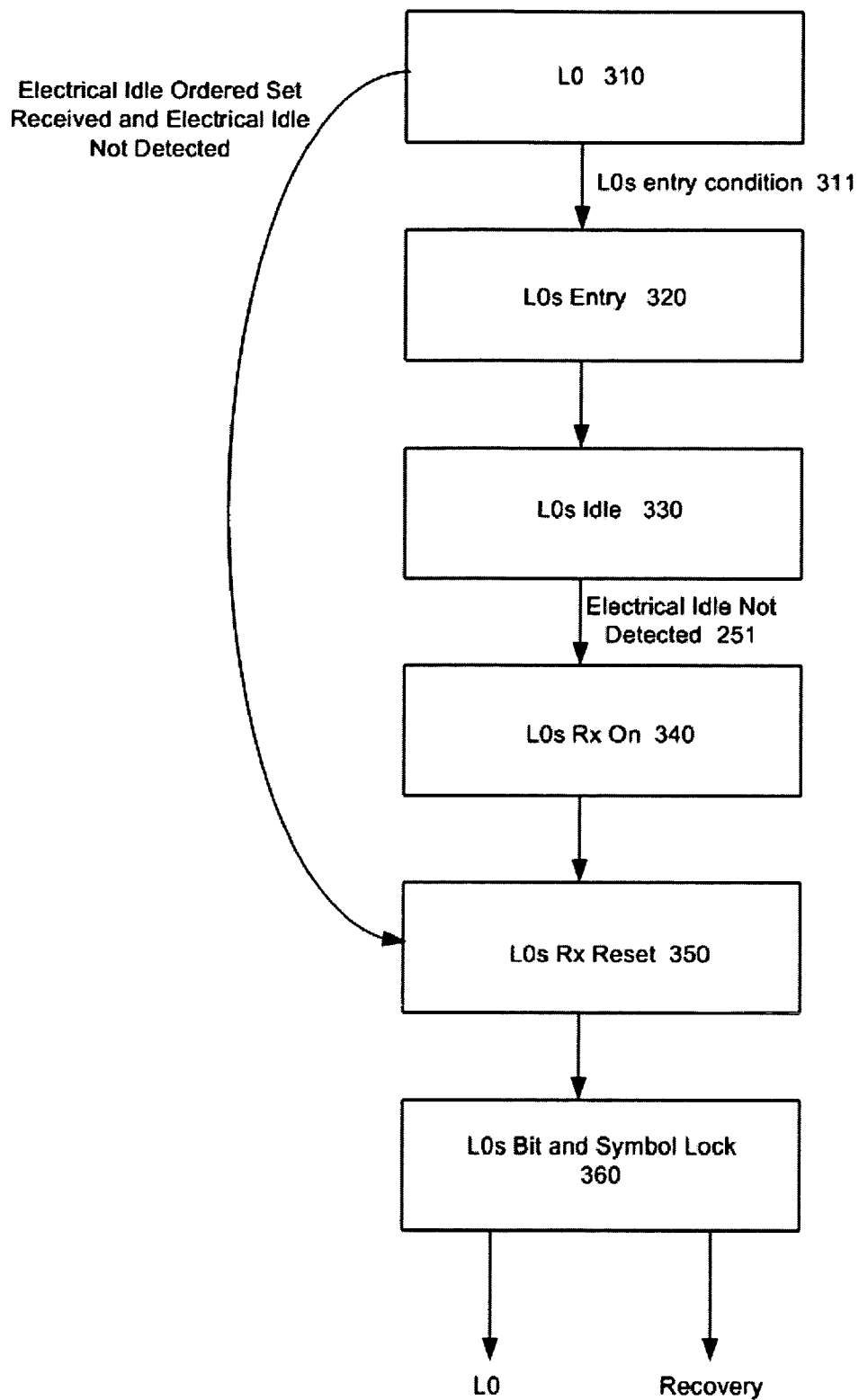
FIG. 3 is a diagram of a state machine implemented in a power management unit.

FIG. 3 is a diagram of a state machine implemented in the power management unit 240. State L0 310 represents a normal operating state where there is activity on the interconnect 145 and the receiver RX 210 is operating at full power. When an electrical idle ordered set works its way through the pipeline and is received at the power management unit 240, a check is made with regard to whether there is activity on the interconnect 145. This check is made by the electrical idle detect circuit 250. The interconnect 145 is deemed to be at electrical idle if the differential signals 145 are at approximately a common mode voltage.

If the interconnect 145 is at electrical idle, then the state machine advances to state L0s entry 320. At the L0s entry state 320, the receiver circuit RX 210 is turned off in order to conserve power. The state machine then advances to an L0s idle state 330. The state machine remains in L0s idle state 330 until the electrical idle detect circuit 250 detects activity (electrical idle not detected) on the interconnect 145. In response to activity on the interconnect 145, the state machine advances to state L0s Rx On 340. In this state, the receiver circuitry 210 is turned on. The process of turning on the receiver 210 may take a number of clock periods. In this example embodiment, the process of turning on the receiver takes 14 clock periods. Once the receiver 210 is turned on, the state machine advances to an L0s Rx Reset state 350. At state 350, the symbol alignment and elastic buffer logic (not shown) in the data extraction unit 220 and the packet processing unit 230 are reset. The state machine then advances to an L0s bit and symbol lock state 360 where the receiver locks on to the incoming bit stream and acquires symbol lock. If the receiving device 200 is unable to detect bit and symbol alignment within an appropriate period of time (during receipt of FTS sequence), then the state machine advances to a recovery state. Otherwise, the state machine re-enters the L0 state 310.

The above discussion of the state machine describes the normal flow for entering and exiting the L0s state. State 310 proceeds to state 320 if there is no activity on the interconnect when an electrical idle ordered set is received at the power management unit 240. However, if there is activity on the interconnect 145 (as determined by the electrical idle detect circuit 250) when the electrical idle ordered set is received at the power management unit 240, then the state machine transitions from the L0s state 310 to the L0s Rx Reset state 350. The state machine still enters L0s, but the steps of turning off and turning back on the receiver are avoided.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. A method, comprising:
receiving an electrical idle ordered set at a receiving device power management unit, the electrical idle ordered set to indicate to the receiving device that a transmitting device coupled to the receiving device via an interconnect is to enter a low power state;
entering a low power entry state if there is no activity on the interconnect based on receipt of the electrical idle ordered set; and
bypassing the low power entry state and entering a low power reset state if there is activity on the interconnect.

2. The method of claim 1, wherein entering a low power entry state includes turning off a receiver circuit in the receiving device.

3. The method of claim 2, further comprising entering a low power idle state following the low power entry state.

4. The method of claim 3, further comprising exiting the low power idle state and entering a low power receiver on state when activity is detected on the interconnect.

5. The method of claim 4, further comprising turning on the receiver circuit while in the low power receiver on state.

6. The method of claim 5, further comprising exiting the low power receiver on state and entering the low power receiver reset state.

7. An apparatus, comprising:
a receiver circuit to provide electrical connection to an interconnect;
an interconnect activity check unit coupled to the receiver circuit, the interconnect activity check unit to determine whether there is activity on the interconnect;

a pipeline to process incoming signals received at the receiver circuit; and a power management unit to receive an electrical idle order set processed by the pipeline, the electrical idle order set to indicate that a transmitting device coupled to the receiver circuit via the interconnect is to enter a low power state, wherein the power management unit is to turn off the receiver circuit if the interconnect activity check unit indicates that there is no activity on the interconnect, and the power management unit to not turn off the receiver circuit if the interconnect activity check unit indicates that there is activity on the interconnect.

8. The apparatus of claim 7, wherein the pipeline includes a data extraction unit and a packet processing unit.

9. The apparatus of claim 8, the receiver circuit including a pair of inputs to receive a pair of differential signals, the differential signals included as part of the interconnect.

10. The apparatus of claim 9, the interconnect activity check unit to indicate that there is no activity on the interconnect if the differential pair of signals are at approximately a common mode voltage.

11. The apparatus of claim 10, the receiver circuit to provide electrical connection to a PCI Express interconnect.

12. A system, comprising:
a transmitting device; and
a receiving device coupled to the transmitting device via an interconnect, the receiving device including
a receiver circuit to provide electrical connection to the interconnect,
an interconnect activity check unit coupled to the receiver circuit, the
interconnect activity check unit to determine whether there is activity on the interconnect,
a pipeline to process incoming signals received at the receiver circuit, and
a power management unit to receive an electrical idle order set processed by the pipeline, the electrical idle order set to indicate that the transmitting device is to enter a low power state, wherein the power management unit is to turn off the receiver circuit if the interconnect activity check unit indicates that there is no activity on the interconnect, and the power management unit to not turn off the receiver circuit if the interconnect activity check unit indicates that there is activity on the interconnect.

13. The system of claim 12, wherein the pipeline includes a data extraction unit and a packet processing unit.

14. The system of claim 13, the receiver circuit including a pair of inputs to receive a pair of differential signals, the differential signals included as part of the interconnect.

15. The system of claim 14, the interconnect activity check unit to indicate that there is no activity on the interconnect if the differential pair of signals are at approximately a common mode voltage.

16. The system of claim 15, wherein the interconnect is a PCI Express interconnect.

* * * * *